United States Patent [19]

Woodfill

[11] Patent Number: 4,515,019

[45] Date of Patent: May 7, 1985

[54] PRESSURE MEASURING DEVICE FOR BOTTLES

[76] Inventor: Ronald C. Woodfill, 4124 Shady Grove, Toledo, Ohio 43623

[21] Appl. No.: 475,295

[22] Filed: Mar. 14, 1983

[51] Int. Cl.³ .............................................. G01L 19/00
[52] U.S. Cl. ........................................ 73/756; 215/228
[58] Field of Search ................. 73/756; 215/228, 365; 116/271

[56] References Cited

U.S. PATENT DOCUMENTS

| | | | |
|---|---|---|---|
| 1,614,022 | 1/1927 | Teichmann | 215/228 |
| 2,017,365 | 10/1935 | Klein | 73/756 |
| 2,535,856 | 12/1950 | Luertzing | 215/228 |
| 2,618,978 | 11/1952 | Ragland | 73/756 |
| 3,797,317 | 3/1974 | Peterson, Jr. | 73/756 |

FOREIGN PATENT DOCUMENTS 563633  6/1957  Italy ....................... 73/756

Primary Examiner—Donald O. Woodiel
Attorney, Agent, or Firm—George R. Royer

[57] ABSTRACT

A pressure measuring device for enclosed bottles, such device being adapted to measure the internal pressure inside an enclosed bottle. The device comprises a pressure measuring gauge integrally interconnected with a bottle cap such that the pressure gauge stem is integrally inserted through the cap to extend into open communication with the internal chamber of the bottle.

1 Claim, 6 Drawing Figures

U.S. Patent    May 7, 1985    4,515,019
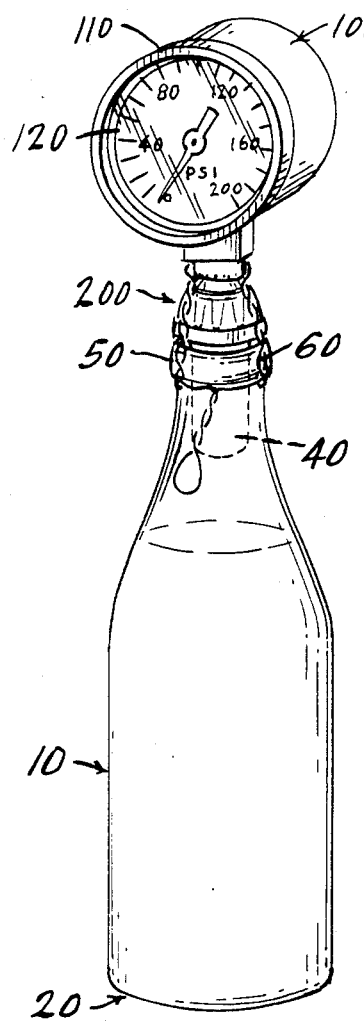
FIG-1-
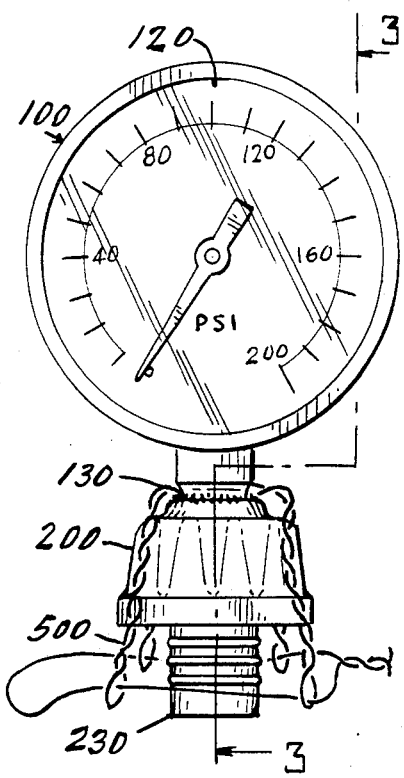
FIG-2-
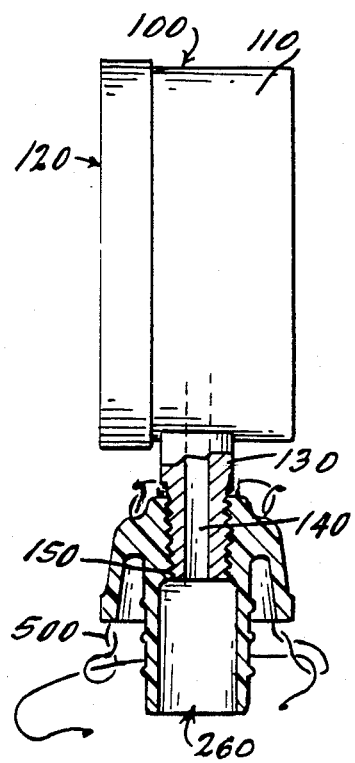
FIG-3-
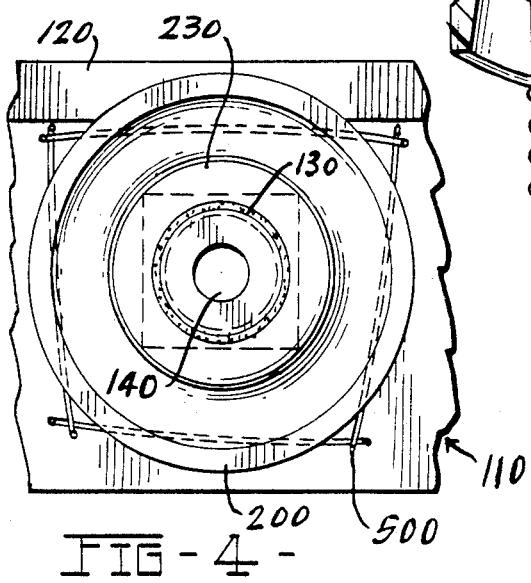
FIG-4-
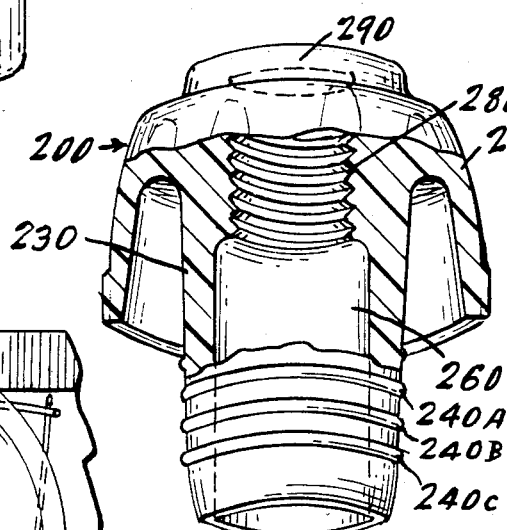
FIG-5-
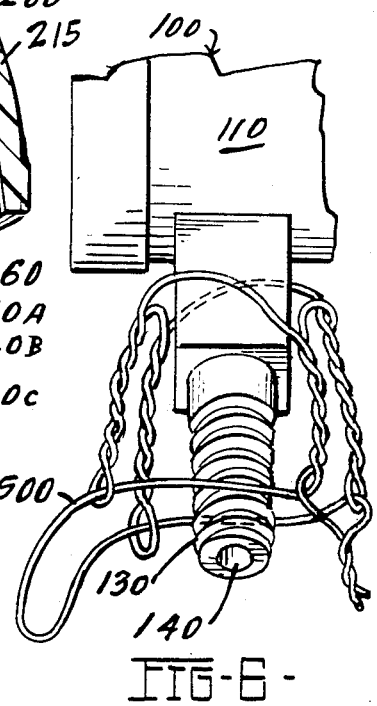
FIG-6-

PRESSURE MEASURING DEVICE FOR BOTTLES

DISCUSSION OF PRIOR ART AND BACKGROUND OF INVENTION

The subject invention relates to winemaking and related processes. Its primarily application is to the process of making and bottling of sparkling wines, in which pressures contained within enclosed vessels are of vital importance and concern in such process. In this latter sense, the subject invention has wider application to processes beyond the winemaking industry, such as the process of making carbonated beverages or other drinks contained under pressure.

In winemaking and other related processes wherein the wine is carbonated, this process is consummated within the confines of an enclosed cask or other suitable container. In smaller winemaking operations, this carbonated process is usually completed in a wine bottle enclosed with a retaining cap or a cork, and the resultant gases, such as carbon dioxide, are contained within the bottle under varying pressure conditions. In general, this gas production and the resultant internal pressures generated within the bottle container are a natural concomitant of the carbonation process. In the event this internal pressure becomes too high, the potential of bottle damage or explosion increases commensurately to such increased bottle pressure. The safety problems that result are easily foreseen.

As a consequence, it is important in the process of making and using sparkling wines that some means be devised to gauge internal pressures at given intervals for safety and other purposes. No such device has been known which provides a method of sealing the bottle and providing in conjunction therewith a pressure measuring apparatus which yields a continuous pressure reading of internal bottle pressures. The purposes of this invention are directed accordingly, and the following objects of the subject invention are set forth as a result.

OBJECTS OF INVENTION

It is an object of the subject invention to provide an improved internal pressure measuring device to yield a continuous reading of internal bottle pressures while the bottle is sealed;

Another object of the subject invention is to provide an improved pressure measuring device for gauging the internal pressures in sealed bottle which are subject to high internal pressures;

Yet another object of the subject invention is to provide an improved device for measuring internal pressures in bottles containing carbonated beverages;

Another object of the subject invention is to provide an improved seal for bottles which has an integrally affixed pressure measuring device therein;

Yet another object of the subject invention is to provide an improved cap for bottles wherein gases are contained under substantial pressures, and wherein such cap has means to measure pressure therein;

Other and further objects of the subject invention will become apparent from a reading of the following description taken in conjunction with the drawings.

DRAWINGS

In the drawings:

FIG. 1 is a perspective view of the subject invention shown as being inserted in the opening of a bottle;

FIG. 2 is a front elevational view of the subject invention;

FIG. 3 is a side elevational view of the subject invention;

FIG. 4 is a cross-section view of the subject invention through the line Z—Z;

FIG. 5 is a perspective view of the subject invention, shown as being partially cut away;

FIG. 6 is a perspective view of the stem of the pressure measuring device of the subject invention.

DESCRIPTION OF GENERAL EMBODIMENT

The subject invention is a combined pressure measuring device integrally interconnected within a wine bottle cap in order to provide at any given time a continuous and instantaneous measure of internal pressures.

Integral to the subject device is a pressure measuring gauge, of generally conventional configuration. This pressure measuring gauge has a downwardly depending hollow cylindrical stem, which is adapted to communicate with the inner bottle chamber containing the gases and resultant pressures to be measured. This hollow cylindrical member is inserted through a hollowed portion of the bottle cap so that the cap and the measuring device form an integrated unit. The hollow cylindrical portion of the gauge cap then, as stated above, communicates with the opening in the cap which, in turn, communicates with the internal area of the bottle so that there is an open passage extending from inside the bottle through the inner chamber of the cap through the stem of the pressure gauge and thence to the inside of the gauge itself. Appropriate means are used to seal the stem inside the cap in order to provide an airtight fit.

DESCRIPTION OF PREFERRED EMBODIMENT

In describing the subject invention, the following reference nomenclature is used. First, the word "upper" will be used in reference to the upper part of the bottle of the subject device. The word "lower" will refer to those portions opposite to the "upper" part.

Referring now to the drawings in which a preferred embodiment of the subject invention is shown, and particularly to FIGS. 1 and 2, a conventional wine bottle 10 is shown. The wine bottle 10 has a relatively flat bottom 20 which is adapted to rest on a horizontal surface. The bottle has an internal chamber 30 adapted to contain therein wine or other appropriate liquids. The top of the bottle 10 tapers into a narrowed neck portion 40. At the top of the neck 40 is top 50 which is formed into an opening 60 of circular configuration. This described structural configuration for bottle 10 is that of a standard wine or other beverage bottle used to hold consumable drinks. Referring now to FIG. 2 in which the preferred embodiment of the subject invention is shown. In this regard, the invention is comprised of two main elements, a pressure measuring gauge 100 and a bottle cap 200 of a generally pliable composition, such as cork or plastic. Other similar materials may be suitable for such cap composition purposes.

In general, the pressure measuring gauge 100 is of conventional constructional configuration, with a housing 110 equipped to contain pressure measuring mechanisms. Affixed to the front of the housing 110 is a dial face 120 with graduated readings thereon to indicate the amount of pressure registered by the gauge. Depending vertically downwardly from the bottom of the housing 110 of gauge 100 is a stem 130. Stem 130 is a hollow, basically cylindrical member, with the internal cylindrical chamber 140 of the stem communicating and otherwise opening directly into the internal chamber of the gauge 100. As can be seen from a view of FIG. 3, the bottom, external surface of the stem 130 is threaded around its circumferential periphery. The bottom of the cylindrical chamber of the stem 140 opens to the outside at the bottom-most extreme 150 of the stem, as shown. The construction of the pressure gauge 100 described above is that of a conventional pressure measuring gauge.

Attention is now directed to FIG. 5 which displays a plastic cork cap 200 utilized to securely seal the bottle contents from spillage, contamination or escape of gases from the liquid in the bottle or inside the bottle container. A view of FIG. 5 reveals that the cap 200 has a mushroom-like shape with an upper bell-like portion 215 and a lower support shaft 230. The shaft 230 has annular protrusions 240A, 240B, and 240C around its lower extremity, as shown in FIG. 5. These annular protrusions serve to anchor or otherwise secure the shaft 230 of cap 200 in the mouth of the bottle 10. The upper bell-like portion 215 of the cap 200 is adapted to fit downwardly over the outer periphery of the bottle top 50 adjacent mouth 60, as shown.

As shown in FIGS. 3 and 5, extending upwardly from the bottom of the cap 200 is a cylindrically-shaped hollow chamber 260, which extends vertically upwardly from the bottom of the shaft 230 from circular opening 265. This chamber 260 thus opens on the bottom thereof at opening 265 to the outside of the cap 200 and thus to the interior of the bottle 10 whenever the cap is inserted into the mouth as shown in FIG. 1. Communicating with the upper part of cylindrical chamber 260 is an upper cylindrical chamber 280, which also extends vertically up and down inside the cap 200. This upper chamber 280, as stated, extends concentrically and vertically above the first chamber 260 as shown in FIGS. 3 and 5. As shown in such latter drawings, the upper chamber has threaded grooves around its peripheral walls, such grooves extending over the complete height of the chamber 280. As can be seen in the drawings, the upper hollow chamber opens at the top thereof and opens on the bottom thereof to lower chamber 260 such that there is a continuous, unobstructed passageway extending from lower mouth 265 completely through chamber 260 through upper chamber 280 and thence to upper mouth 290 in upper chamber 280.

Referring now to FIGS. 2 and 3, the pressure gauge 100 and the bottle cap 200 are interconnected as follows. The stem 130 of the gauge 100 is inserted into the upper chamber 280 of the cap by screwing same into the mating female grooves on the peripheral walls of upper chamber 280. As can be observed from a view of the drawings, the stem 130 is of a diameter which is approximately equal to the diameter of the upper chamber 280 in the cap 200. This latter relationship is obviously necessary in order that the stem 130 fits securely into the upper chamber 280.

Once the stem 130 is threaded into the upper chamber 280 of cap 200, as shown and described above, a suitable adhesive, such as an epoxy glue or other substance, is placed in a heated or molten condition around the mouth 290 of upper chamber 2 0 and the outer circumference of the adjacent stem 130 in order to effect a suitable seal between the cap 200 and the stem 130.

Once the latter evolution or process is completed and the epoxy glue has cured, the cap 200 with affixed pressure measuring gauge can be inserted in the bottle opening 60, as shown. ONce so inserted, it is noted from a view of FIGS. 1 and 3, that there is a continuous passageway extending completely from the interior of the bottle 10 up through chamber 260, thence through chamber 140 in stem 130 and into the gauge proper. By this arrangement the gauge 100 will provide an uninterrupted measure and reading of the pressure inside bottle 10. A tie wire 500 may be emplaced around the cap to secure the cap 200 to the bottle 10, as desired.

While a specific embodiment of the subject invention is shown, it is to be stressed that such description shall not limit the scope of the following claims.

I claim:

1. A cap for an enclosed bottle with an opening, said device incorporating pressure measuring capabilities, comprising:

(a) a bottle cap member with a vertically depending shaft, with such shaft having a vertically aligned central longitudinal axis, such shaft adapted to fit downwardly into the opening of the bottle, said cap member having a hollow chamber therein extending completely through the cap from the bottom of the shaft to the upper extreme of said cap, whereby said cap has a continuous chamber open at the bottom and the top of said cap, said cap member having a threaded exterior lower circumferential surface for engagement with said bottle opening, said hollow chamber having a threaded circumferential extending surface to receive a mating threaded surface;

(b) a pressure measuring gauge which has a downwardly depending stem with an open chamber therein, said stem being affixed concentrically in the upper part of the continuous chamber in said cap, such that said stem communicates directly with the hollow chamber of said cap member, said stem having a circumferentially extending surface which is threaded so as to securely engage the interior portions of the bottle cap member.

* * * * *